US008675591B2

(12) United States Patent
Gou

(10) Patent No.: US 8,675,591 B2
(45) Date of Patent: Mar. 18, 2014

(54) METHOD FOR MOBILE RECEPTION OF MULTIMEDIA BROADCAST MULTICAST SERVICE BY USER EQUIPMENT, AND USER EQUIPMENT

(75) Inventor: Wei Gou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/503,775

(22) PCT Filed: Jan. 31, 2011

(86) PCT No.: PCT/CN2011/070855
§ 371 (c)(1),
(2), (4) Date: Apr. 24, 2012

(87) PCT Pub. No.: WO2011/098023
PCT Pub. Date: Aug. 18, 2011

(65) Prior Publication Data
US 2012/0294220 A1    Nov. 22, 2012

(30) Foreign Application Priority Data
Feb. 12, 2010  (CN) .......................... 2010 1 0114503

(51) Int. Cl.
*H04W 4/00* (2009.01)
(52) U.S. Cl.
USPC .......................................... 370/329; 370/341
(58) Field of Classification Search
None
See application file for complete search history.

(56) References Cited

U.S. PATENT DOCUMENTS

| 8,422,441 B2* | 4/2013 | Dan ............................. 370/329 |
| 2005/0153715 A1* | 7/2005 | Hwang et al. .................. 455/458 |
| 2009/0122740 A1* | 5/2009 | Bouazizi ....................... 370/312 |
| 2011/0080859 A1* | 4/2011 | Phan et al. .................... 370/312 |
| 2011/0103288 A1* | 5/2011 | Lee et al. ...................... 370/312 |
| 2011/0134903 A1* | 6/2011 | Ko et al. ....................... 370/344 |
| 2012/0014264 A1* | 1/2012 | Wang ............................ 370/252 |
| 2012/0039233 A1* | 2/2012 | Kim et al. ..................... 370/312 |

FOREIGN PATENT DOCUMENTS

| CN | 101370239 A | 2/2009 |
| CN | 101521850 A | 9/2009 |
| CN | 101572859 A | 11/2009 |
| WO | 2008137354 A1 | 11/2008 |

OTHER PUBLICATIONS

International Search Report for PCT/CN2011/070855 dated Apr. 21, 2011.

* cited by examiner

*Primary Examiner* — Chi Pham
*Assistant Examiner* — Soon-Dong D Hyun
(74) *Attorney, Agent, or Firm* — Ling Wu; Stephen Yang; Ling and Yang Intellectual Property

(57) ABSTRACT

Disclosed in the present invention are a method for mobile reception of a multimedia broadcast multicast service (MBMS) by a user equipment and a user equipment. The method includes: when a UE moves from a source cell to a target cell, the UE judges whether the UE will move out of or has already moved out of one or more multimedia broadcast multicast single frequency network (MBSFN) areas.

19 Claims, 3 Drawing Sheets

METHOD FOR MOBILE RECEPTION OF MULTIMEDIA BROADCAST MULTICAST SERVICE BY USER EQUIPMENT, AND USER EQUIPMENT

TECHNICAL FIELD

The present invention relates to a long term evolution (LTE) system, and particularly, to the consecutive reception of a multimedia broadcast multicast service (abbreviated as MBMS) in a multimedia broadcast multicast single frequency network (abbreviated as MBSFN) area.

BACKGROUND OF THE RELATED ART

With the rapid development of Internet and the popularization of large-screen multi-functional mobile phones, there appear a large number of mobile data multimedia services and various high bandwidth multimedia services, such as video conference, TV broadcast, video on demand, video advertisement, online education, interactive game, which not only meets the increasing service demand of the mobile user but also brings new service increase points to the mobile operators. These mobile data multimedia services require that a plurality of users can simultaneously receive the same data, and as compared to common data service, it has features such as large data amount, long duration, and sensitive delay. In order to effectively use the mobile network resources, the 3rd Generation Partnership Project (abbreviated as 3GPP) proposes MBMS, which is a technology for transmitting data from one data source to a plurality of targets, achieving the share of the network (including core network and access network) resources and improving the utilization rate of the network resources (especially air interface resources). The MBMS defined by 3GPP can not only achieve message class multicast and broadcast with pure text and low rate but also achieve the broadcast and multicast of high speed multimedia services and provide various rich video, audio and multimedia services, which undoubtedly conforms to the development trend of the future mobile data and provides a better service prospect for the development of 3G (3rd Generation).

In the LTE, the transmission of MBMS is done in a multi-cell mode to transmit, i.e. the MBMS sent by adjacent cells support combination. The essence of the combination is that several cells constitute an MBSFN area, then the cells constituting the MBSFN area send the same MBMS data on the same resources at the same moment, so that when the MBMS data sent by each cell are transmitted in the air, the data signals from different cells overlap with each other naturally in the air, thus increasing the reliability of the data, and the particular data transmission in the multi-cell mode can be made with reference to the description of Multi-cell transmission in Article 15, Section 3.3 of 36.300v920 protocol in the LTE protocol.

Currently, Multicast Traffic Channel (abbreviated as MTCH), Multicast Control Channel (abbreviated as MCCH), dynamic scheduling information (abbreviated as DSI, it is also referred to as MCH scheduling information, abbreviated as MSI) are formulated in the LTE, these information are all sent in the multi-cell mode, i.e. adjacent cells send the same above channel data on the same resources at the same moment so as to form an MBSFN combination area, even out of the MBSFN area boundary, information such as MTCH, MCCH, and DSI can also be normally received at the cell boundary, thus achieving the reception of MBMS. Currently in the LTE, the location of the MBSFN area is preconfigured that which cells belong which MBSFN area are fixed during networking, if the UE moves out of the MBSFN area, then he will not be able to normally receive the MBMS of this MBSFN area, that is to say, the MBSFN area is no longer consecutive, therefore, the MBMS in this MBSFN area is no longer consecutive, and so, the consecutiveness of the MBSFN area and the consecutiveness of the MBMS service in the MBSFN area is complementary. As such, when the user moves, the following situation may occur.

Due to the transmission feature of the MBMS in the LTE, the user can still normally receive the MBMS within a relatively large range after the user has moved out of the MBSFN area, which is because the control information about the MBMS is all sent in the manner of MBSFN and has rather strong signal overlap gain so that the control information still can be normally received by the UE when the UE has just moved out of the MBSFN area. For example, after the UE has just moved out of the MBSFN area, since the MCCH, MTCH and DSI information are all transmitted in the manner of MBSFN and have rather strong overlap gain, as long as the configuration information about the location of the MCCH channel in the SIB13 of the cell in the MBSFN area is not changed (which is the same as the case when UE moves out of the MBSFN area, in addition, according to the provisions of the LTE protocol, the location information about the MCCH channel on SIB13 is configured semi-statically and does not change for a long time), the UE can normally receive the MBMS within a relatively large range after having just moved out of the MBSFN area. However, at this moment, the UE has already actually moved out of the MBMS service area which subscribes with the operator, the operator cannot ensure the quality of the MBMS, and the MBMS may be accidentally interrupted.

As shown in FIG. 1, the areas surrounded by the curves constitute an MBSFN area ID1 area, in which cell B is a cell adjacent to the MBSFN area ID1 area, there is no MBMS in cell B or in other words, there is no service of the MBSFN area ID1 area, that is because there can be services of other MBSFN areas in cell B. Then, when a UE (User Equipment) which is receiving the MBMS moves from cell A to cell B, this UE can continue to receive the MBMS which is being received and belongs to the MBSFN area ID1 area at the moment when this UE just moves into cell B (i.e. the UE is still at the boundary of cell B close to cell A). This is because the MBMS data carried in MTCH and the control information MCCH and DSI of MBMS are all transmitted in the manner of multi-cell, after the same MBMS data from cells A, C and D naturally overlap with each other in the air, they can be normally received at a location in cell B close to MBSFN area ID1. However, with the UE continuing to move to the central area of cell B or a location farther away from the MBSFN area ID1, the reception effect of MBMS will become worse, until the MBMS cannot be received correctly, which causes the MBMS of this UE interrupted.

As to FIG. 2, the illustrated cell B belongs to a reserved cell in the MBSFN area ID1 area (the definition of reserved cell is described in Article 15 "MBSFN Area Reserved Cell" of 36.300 protocol), when the UE moves from cell A to reserved cell B, there also exist the above problems.

As to the user of this UE, the accident interruption of the MBMS makes the user feel bad, in case of no prompt information, the user does not know the MBMS signal becomes worse or the MBMS is stopped by the operator, thus making the quality of service evaluation to the operator by the user quite poor.

SUMMARY OF THE INVENTION

The technical problem to be solved by the present invention is to provide a method for mobile reception of MBMS by UE and a user equipment, so as to improve user satisfaction.

In order to solve the above problem, the present invention provides a method for mobile reception of a multimedia broadcast multicast service (MBMS) by a user equipment (UE), comprising: when the UE moves from a source cell to a target cell, the UE judging whether the UE will move out of or has already moved out of one or more multimedia broadcast multicast single frequency network (MBSFN) areas. The above method can further have the following features: the UE is a UE with MBMS ability, and the UE comprises a UE which is receiving an MBMS or a UE which is monitoring a multicast control channel (MCCH) change notification message.

The above method can further have the following features: moving out of one or more MBSFN areas refers to: moving out of an MBSFN area to which the MBMS being received by the UE belongs, or moving out of an MBSFN area to which the MCCH change notification message being monitored by the UE belongs.

The above method can further have the following features: when the UE moves from the source cell to the target cell, when the UE is located in the source cell, the UE judges whether the UE will move out of one or more MBSFN areas; and when the UE is located in the target cell, the UE judges whether or not the UE has already moved out of one or more MBSFN areas.

The method can further comprise: when the UE judges whether the UE will move out of or the UE has already moved out of one or more MBSFN areas, the UE displaying prompt information to the user for prompting the user that the UE will move out of or has already moved out of the MBSFN area or an MBMS subscription area and the MBMS will be interrupted or the quality of the MBMS is not ensured.

The method can also have the following feature: the step of the UE judging whether the UE will move out of or has already moved out of one or more MBSFN areas comprises:

the UE judging whether a system information block type 13 of the target cell is scheduled to send, and when the system information block type 13 is not scheduled to send, the UE judging the UE will move out of or has already moved out of one or more MBSFN areas.

The method can also have the following feature: the step of the UE judging whether the UE will move out of or has already moved out of one or more MBSFN areas further comprises: when the system information block type 13 of the target cell is scheduled to send, acquiring one or more parameters in the MBSFN area information carried in the system information block type 13, and judging whether the UE will move out of or has already moved out of the MBSFN area according to the one or more parameters.

The method can also have the following feature: the step of the UE judging whether the UE will move out of or has already moved out of one or more MBSFN areas comprises:

the UE acquiring one or more parameters in the MBSFN area information carried in the system information block type 13 in the target cell and judging whether the UE will move out of or has already moved out of the MBSFN area according to the one or more parameters.

The method can also have the following feature: the parameter is an MBSFN area information list and/or an MCCH configuration information list, and the step of judging whether the UE will move out of or has already moved out of the MBSFN area according to the one or more parameters comprises:

the UE judges whether a MBSFN area identifier of the MBSFN area is included in a MBSFN area information list carried in the system information block type 13 of the target cell, if not included, then the UE judging that the UE will move out of or has already moved out of the MBSFN area, the MBSFN area is inconsecutive between the source cell and the target cell, if included, then the MBSFN area is consecutive between the target cell and the source cell; and/or, the UE judges whether the MCCH configuration information about the MBSFN area to which the UE belongs is included in the MCCH configuration information list carried in the system information block type 13, if not included, then the UE judges that the UE will move out of or has already moved out of the MBSFN area.

The present invention also provides a user equipment (UE), configured to: when moving from a source cell to a target cell, judge whether it will move out of or it has already moved out of one or more multimedia broadcast multicast single frequency network (MBSFN) areas.

The above user equipment can have the following features: the UE is a UE with the multimedia broadcast multicast service ability.

The above user equipment can have the following features: the UE is configured to: when moving from the source cell to the target cell, when the UE is receiving an MBMS or is receiving an MCCH change notification message, judge whether it will move out of an MBSFN area to which the MBMS being received by the UE belongs or to which the MCCH change notification message being monitored by the UE belongs.

The above user equipment can have the following features: the UE is further configured to: when judging that the UE will move out of or has already moved out of the MBSFN area, display prompt information to the user for prompting the user that the UE will move out of or has already moved out of the MBSFN area or an MBMS subscription area and the MBMS will be interrupted or the quality of the MBMS is not ensured.

The above user equipment can have the following features: the UE is configured to judge whether it will move out of or it has already moved out of one or more MBSFN areas by way of the following manners:

judge whether a system information block type 13 of the target cell is scheduled to send, when the system information block type 13 is not scheduled to send, the UE judges that the UE will move out of or has already moved out of the MBSFN area; when the system information block type 13 of the target cell is scheduled to send, further acquire one or more parameters in the MBSFN area information carried in the system information block type 13, and judge whether the UE will move out of or has already moved out of the MBSFN area according to the one or more parameters;

or, directly acquire one or more parameters in the MBSFN area information carried in the system information block type 13 of the target cell and judge whether the UE will move out of or has already moved out of the MBSFN area according to the one or more parameters.

The above user equipment can have the following features: the UE is configured to: acquire an MBSFN area information list and/or MCCH configuration information list carried in the system information block type 13 of the target cell, judge whether a MBSFN area identifier of the MBSFN area to which the UE belongs is included in the MBSFN area information list carried in the system information block type 13 of the target cell, if not included, then judge that the DE will move out of or has already moved out of the MBSFN area; and/or, judge whether the MCCH configuration information about the MBSFN area to which the UE belongs is included in the MCCH configuration information list carried in the system information block type 13, if not included, then judge that the UE it will move out of or has already moved out of the MBSFN area.

The present invention also provides a method for mobile reception of a multimedia broadcast multicast service (MBMS) by a user equipment (UE), the method comprising:

when a UE moves from a source cell to a target cell, the UE judging whether one or more multimedia broadcast multicast single frequency network (MBSFN) areas where the UE is located are consecutive between the source cell and the target cell.

The above method can further have the following features: the UE is a UE with MBMS ability, and the UE comprises a UE which is receiving an MBMS or a UE which is monitoring a multicast control channel (MCCH) change notification message.

The above method can further have the following features: the one or more MBSFN areas refer to: an MBSFN area to which the MBMS being received by the UE belongs, or an MBSFN area to which the MCCH change notification message being monitored by the UE belongs.

The above method can further have the following features: the step of the UE judging whether the one or more MBSFN areas are consecutive between the source cell and the target cell comprises:

the UE judging whether a MBSFN area identifier of the MBSFN area is included in a MBSFN area information list carried in the system information block type 13 of the target cell, if not included, then the UE judging that the MBSFN area is inconsecutive between the source cell and the target cell, if included, then the UE judging that the MBSFN area is consecutive between the target cell and the source cell.

The above method can further comprises: when the UE judges that the one or more MBSFN areas are inconsecutive between the source cell and the target cell, the UE displaying prompt information to the user for prompting the user that the UE will move out of or has already moved out of the MBSFN area or an MBMS subscription area and the MBMS will be interrupted or the quality of the MBMS is not ensured.

The present invention also provides a user equipment (UE), and the UE is configured to:

when moving from a source cell to a target cell, judge whether or not one or more multimedia broadcast multicast single frequency network (MBSFN) areas where the UE is currently located are consecutive between the source cell and the target cell.

The above user equipment can further have the following features: the UE is a UE with MBMS ability, and the UE comprises a UE which is receiving an MBMS or a UE which is monitoring a multicast control channel (MCCH) change notification message.

The above user equipment can further have the following features: the one or more MBSFN areas refer to: an MBSFN area to which the MBMS being received by the UE belongs, or an MBSFN area to which the MCCH change notification message being monitored by the UE belongs.

The above user equipment can further have the following features: the UE is configured to:

judge whether a MBSFN area identifier of the MBSFN area is included in a MBSFN area information list carried in the system information block type 13 of the target cell, if not included, then judge that the MBSFN area is inconsecutive between the source cell and the target cell, if included, then judge that the MBSFN area is consecutive between the target cell and the source cell.

The above user equipment can further have the following features: the UE is further configured to: when it is judged that the one or more MBSFN areas are inconsecutive between the source cell and the target cell, display prompt information to the user for prompting the user that it will move out of or it has already moved out of the MBSFN area or an MBMS subscription area and the MBMS will be interrupted or the quality of the MBMS is not ensured.

In the present invention, when the MBMS being received by the UE is interrupted (or to be interrupted), the UE can correctly judge whether it is caused by poor signal coverage quality in the subscription area of the operator or the MBMS interruption is caused by the user himself, thus the responsibility can be clarified and the user can be prompted timely, thereby reducing the responsibility dispute between the operator and the user and improving user experience. Furthermore, by the present invention, accurate judgment can be achieved by using some existing information from the view of the user with no need of the cooperation of the network side, or the network side to send a signaling.

PREFERRED EMBODIMENTS OF THE PRESENT INVENTION

Figure 1:
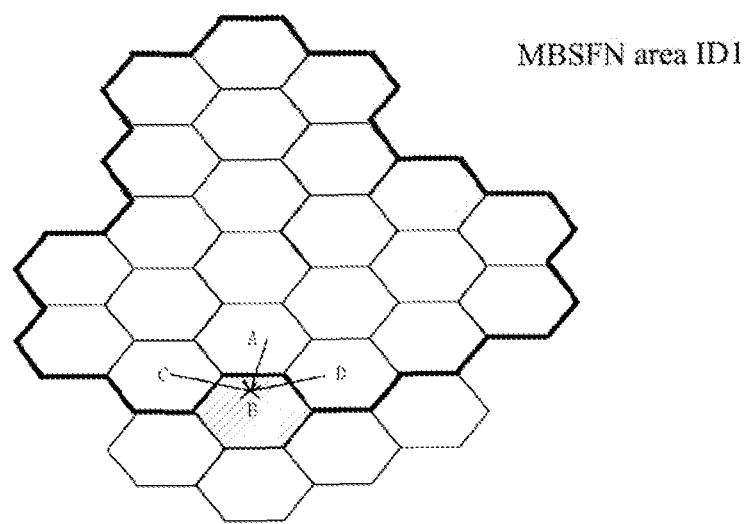
FIG. 1 is a scenario illustration 1 of the present invention.

The concept of the present invention is as follows: as to a mobile UE (especially a UE with MBMS ability, the UE without MBMS ability cannot receive the MBMS in the physical multicast channel (PMCH)), when it moves from a source area to a target area, the UE needs to judge whether the target cell has moved out of one or more MBSFN areas where the UE is currently located (or described as when the UE moves from a source cell to a target cell, the UE needs to judge whether the one or more MBSFN areas where the UE is currently located are consecutive between the source cell and the target cell), and hereinafter, it will be described just using one of the manners. After judgment, the UE prompts the user of whether it will move out of or has already moved out of the current MBSFN area according to the judgment result, if yes, then the UE will prompt the user that the MBMS will be interrupted since the UE will move out of or has already moved out of the MBSFN area due to the movement of the user. As such, the user is prompted by way of a friendly interface, which provides better experience to the user. At this moment, the user can select to continue to receive the MBMS until the MBMS cannot be received correctly, but at this moment, since it has already moved out of the MBSFN area, the operator will not ensure the reception quality of the MBMS for the user.

The present invention provides a method for mobile reception of MBMS by a UE, comprising: when a UE (a UE with MBMS ability) moves from a source cell to a target cell, the UE judging whether the UE will move out of or has already moved out of one or more multimedia broadcast multicast single frequency network (MBSFN) areas or judging whether the MBSFN area where the UE is located are consecutive between the source cell and the target cell.

In this case, the UE with MBMS ability comprises a UE which is receiving the MBMS, or a UE which is monitoring a MCCH (multicast control channel) change notification message. Moving out of one or more MBSFN areas refer to: moving out of an MBSFN area to which the MBMS being received by the UE belongs, that is, the MBSFN area is inconsecutive between the source cell and the target cell of the UE, or moving out of an MBSFN area to which the MCCH change notification message being monitored by the UE belongs.

When the UE judges that it will move out of or it has already moved out of the MBSFN area, the UE displays prompt information to the user for prompting the user that the UE will move out of or has already moved out of the MBSFN area or an MBMS subscription area and the MBMS will be interrupted or the quality of the MBMS is not ensured.

In this case, when the UE with MBMS ability moves from the source cell to the target cell, when the UE is located in the source cell, the UE needs to judge whether the UE will move out of one or more MBSFN areas; and when the UE is located in the target cell, the UE needs to judge whether or not it has already moved out of one or more MBSFN areas.

There can be a plurality of current MBSFN areas, for example, a certain UE is receiving the MBMS from two different MBSFN areas simultaneously, when it moves from the source cell to the target cell, the UE has to judge whether it will move out of two MBSFN areas respectively. As to a certain UE which is monitoring the MCCH change notification messages of two different MBSFN areas, when it moves from the source cell to the target cell, the UE has to judge whether it will move out of two MBSFN areas respectively.

Herein, the UE carries out judgment according to whether the system information block is scheduled to send or according to some parameters in the system information block, and in the LTE, since the protocol formulates that SIB13 (SystemInformationBlockType13) is an MBMS specific system information block, the present invention is described by taking SIB13 as an example. When the MBMS specific system information block is renamed, the judgment will be carried out according to the renamed specific system information block.

In this case, the UE judging whether or not it will move out of one or more MBSFN areas according to whether the SIB13 is scheduled to send or according to information in the SIB13 in particular comprises:

1) the UE judging whether a system information block type 13 of the target cell is scheduled to send, and when the system information block type 13 is not scheduled to send, the UE judging that it will move out of or it has already moved out of the MBSFN area; or 2) when the UE judging that the system information block type 13 of the target cell is scheduled to send, the UE also acquiring one or more parameters in the MBSFN area information (MBSFN-AreaInfo-r9) carried in the system information block type 13, and judges whether the UE will move out of or has already moved out of the MBSFN area according to the one or more parameters, or 3) the UE directly acquiring one or more parameters in the MBSFN area information carried in the system information block type 13 in the target cell and judging whether the UE will move out of or has already moved out of the MBSFN area according to the one or more parameters.

The parameter in 2) and 3) is an MBSFN area information list and/or an MCCH configuration information list, the UE judges whether the MBSFN area identifier (mbsfn-AreaId-r9) of the MBSFN area to which it belongs is included in the MBSFN area information list carried in the system information block type 13 of the target cell, if not included (i.e. the MBSFN area information list carried in the system information block type 13 of the target cell does not have the mbsfn-AreaId-r9), then the UE judges that it will move out of or has already moved out of the MBSFN area, then the MBSFN area is inconsecutive between the source cell and the target cell; if included (i.e. the MBSFN area information list carried in the system information block type 13 of the target cell has mbsfn-AreaId-r9), then the UE judges that it will not move out of or has not moved out of the MBSFN area, then the MBSFN area is consecutive between the source cell and the target cell; and/or, the UE judges whether the MCCH configuration information of the MBSFN area to which it belongs is included in the MBSFN area information list carried in the system information block type 13, if not included, then the UE judges that it will move out of or has already moved out of the MBSFN area.

In this case, in 2) and 3), after having received SIB13, the UE judges whether the MBMS being received by the UE is being sent continuously in the target cell according to one or more parameters in the MBSFN area information in SIB13, and it is in particular by judging whether the MBSFN area identifier (mbsfn-AreaId-r9) of the MBSFN area to which the MBMS being received by the UE belongs is included in the MBSFN area information list, if not included, then the MBMS being received by the UE is not sent continuously in the target cell, which indicates that the target cell does not belong to the MBSFN area to which the MBMS being received by the UE belongs, that is to say, the MBSFN area is inconsecutive between the source cell and the target cell, the user equipment moves out of the MBSFN area to which the multimedia broadcast multicast service being received belongs, if included, then the MBMS being received by the UE is being sent continuously in the target cell, which indicates that the target cell belongs to the MBSFN area to which the MBMS being received by the UE belongs, that is to say, the MBSFN area is consecutive between the source cell and the target cell. The parameter for judgment is MBSFN area identifier (mbsfn-AreaId-r9) or the configuration of MCCH (mcch-Config-r9). When the mcch-Config-r9 parameter is used as a judgment parameter, in particular, the repetitionPeriod-r9, offset-r9, and sf-AllocInfo-r9 parameters in the MCCH configuration information (mcch-Config-r9) of the MBSFN area to which the MBMS being received by the UE belongs are compared with the corresponding parameters repetitionPeriod-r9, offset-r9, and sf-AllocInfo-r9 in the MCCH configuration information of all the MBSFN areas in the SIB13 of the target cell, if any group of parameters are different, then it is judged that the target cell does not belong to the MBSFN area to which the MBMS being received by the UE belongs, and the user equipment moves out of the MBSFN area to which the multimedia broadcast multicast service being received belongs.

In this case, after having acquired the SIB1 (SystemInformationBlockType1) of the target cell, the UE learns whether SIB13 is scheduled to send from the information in SIB1.

In this case, there are two methods for the UE to acquire the SIB1 of the target cell:

the first is that the UE actively receives the SIB1 of the target cell, and as long as the UE is located at the intersection between the source cell and the target cell, the UE can receive the SIB1 of the target cell; and the second is that the source cell directly notifies the UE of whether the SIB13 of the target cell is scheduled to send.

In this case, there are two methods for the UE to acquire the SIB13 of the target cell:

the first is that the UE actively receives the SIB13 of the target cell, and as long as the UE is located at the intersection between the source cell and the target cell, the UE can receive the SIB13 of the target cell; and the second is that the source cell sends the SIB13 of the target cell to the UE, which requires the base station controlling the source cell and the target cell to carry out information interaction.

As to a UE which is receiving MBMS or a UE which is receiving an MCCH change notification message, when it moves from the source cell to the target cell, the UE needs to judge whether the target cell has already moved out of the current MBSFN area, and the judgment processing manner is the same. Hereinafter, a UE which is receiving MBMS will be taken as an example.

Hereinafter, the method of judging whether the target cell has already moved out of the MBSFN area to the MBMS being received belongs or judging whether the MBSFN is consecutive between the source cell and the target cell is described in detail below.

Method 1

After having received the SIB13 of the target cell, the UE judges whether the UE moves out of the MBSFN area to which the MBMS being received belongs according to one or more parameters in the MBSFN area information (MBSFN-AreaInfo-r9) in SIB13. The parameter for judgment is MBSFN area identifier (mbsfn-AreaId-r9).

After having received the SIB13 of cell B (target cell, i.e. the UE will move to this cell), the UE reads out the MBSFN-AreaInfo-r9 therein, then judges whether the mbsfn-AreaId-r9 of the MBSFN area to which the MBMS being received by the UE belongs is included in the MBSFN-AreaInfo-r9, if yes, then it indicates that the source cell and the target cell of UE belong to the MBSFN simultaneously, which indicates that the MBSFN area is consecutive between the source cell and the target cell and indicates that the MBMS being received by the UE is sent in cell B, at this moment, the UE can receive MBMS according to the existing flow; otherwise, the UE will move out of the MBSFN area to which the MBMS being received belongs, i.e. the target cell does not belong to the MBSFN area, and the MBSFN area is inconsecutive between the source cell and the target cell, at this moment, the UE can trigger the prompt information to prompt the user that since the user has left the service area of MBMS being received, this MBMS will be interrupted or the operator cannot ensure the quality of the MBMS being received by the UE at the moment, that is because the UE has already left the MBMS subscription area. When the UE judges that there is MBMS received by the UE in the target cell but the MBMS of the UE is interrupted in the target cell (it cannot be received correctly, the image quality is poor, there are snow points, etc.), the UE can prompt the user that this place belongs to an area with poor MBMS signal coverage quality of the operator.

The following is the parameter contents of SIB13.

| SystemInformationBlockType13 information element |
| --- |
| -- ASN1START |
| SystemInformationBlockType13-r9 ::=  SEQUENCE { |
| mbsfn-AreaInfoList-r9  MBSFN-AreaInfoList-r9, |
| notificationConfig-r9  SEQUENCE { |
| notificationRepetitionCoeff-r9  ENUMERATED (n2, n4), |
| notificationOffset-r9  INTEGER (0..10), |
| notification-subframe-r9  INTEGER (1..6) |
| }, |
| ... |
| } |
| MBSFN-AreaInfoList-r9 ::=  SEQUENCE  (SIZE(1..maxMBSFN-Area)) OF MBSFN-AreaInfo-r9 |
| MBSFN-AreaInfo-r9 ::=  SEQUENCE { |
| mbsfn-AreaId-r9  INTEGER (0..255), |
| notificationIndicator-r9  INTEGER (0..7), |
| mcch-Config-r9  SEQUENCE { |
| repetitionPeriod-r9  ENUMERATED {rf32, rf64, rf128, rf256}, |
| offset-r9  INTEGER (0..10), |
| modificationPeriod-r9  ENUMERATED {rf512, rf1024}, |
| sf-AllocInfo-r9  BIT STRING (SIZE(6)), |
| signallingMCS-r9  ENUMERATED {n2, n7, n13, n19} |
| }, |
| ... |
| } |
| -- ASN1STOP |

Method 2

Whether the UE moves out of the MBSFN area to which the MBMS being received belongs is judged according to whether SIB13 is scheduled and sent out. After having received the SIB1 of the target cell, the UE can learn whether the SIB13 is scheduled and sent out from SIB1, which is in particular as judging whether the SIB13 is scheduled and sent out according to the sib-MappingInfo parameter included in the scheduling information list (schedulingInfoList) included in SIB1.

When receiving the SIB1 of cell B, the UE can judge whether the SIB13 is scheduled to send according to the parameter schedulingInfoList in SIB1, if the SIB13 is not scheduled to send (i.e. SIB13 is not sent out in the target cell B), it indicates that the UE will move out of the MBSFN area to which the MBMS being received belongs, and at this moment, the UE can trigger the prompt information to prompt the user that since the user has already left the service area of MBMS being received, this MBMS will be interrupted or that since the UE has already left the MBMS subscription area at this moment, the operator will not ensure the quality of MBMS being received by the UE. If the SIB13 is scheduled to send, then the UE receives the SIB13 and reads the MBSFN-AreaInfo-r9 therein, and then the UE judges whether the identifier of the MBSFN area to which the MBMS being received by the UE belongs is included in the MBSFN-AreaInfo-r9, if yes, then it indicates that the MBMS being received by the UE is sent in cell B. At this moment, the UE can receive the MBMS according to the existing flow. When the UE judges that there is MBMS received by the UE in the target cell but the MBMS of the UE is interrupted in the target cell (it cannot be received correctly, the image quality is poor, there are snow points, etc.), the UE can prompt the user that this place belongs to an area with poor signal coverage quality of the operator.

The following is the parameter contents of SIB1:

Embodiment 1

Embodiment 1 corresponds to the situation of moving out of the MBSFN area (i.e. the MBSFN area is inconsecutive between the source cell and the target cell).

Figure 2:
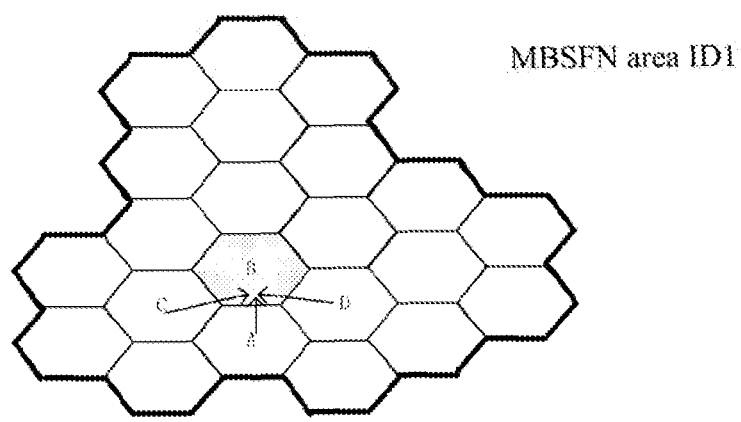
FIG. 2 is a scenario illustration 2 of the present invention.

Assuming that in a certain MBSFN area, as shown in FIG. 1 or 2, the difference between FIG. 1 and FIG. 2 lies in that cell B in FIG. 1 is a cell joined with the certain MBSFN area and cell B in FIG. 2 is a reserved cell in the certain MBSFN, and the same lies in that the MBMS of this MBSFN area is not sent in cells B in FIGS. 1 and 2, this MBSFN area is inconsecutive in cell B. Due to being adjacent to the MBSFN area, there are strong MBMS signal which can be received at the boundary of cell B close to the MBSFN area, however, with the UE moving to the center of cell B, the MBMS signal gradually disappears, therefore, when the UE moves from the MBSFN area to the center of cell B, the MBMS originally received by the UE in the MBSFN area will be interrupted, and in order to notify the user before the MBMS is interrupted, the flow shown in FIG. 3 or 4 should be added at the UE side.

Figure 3:
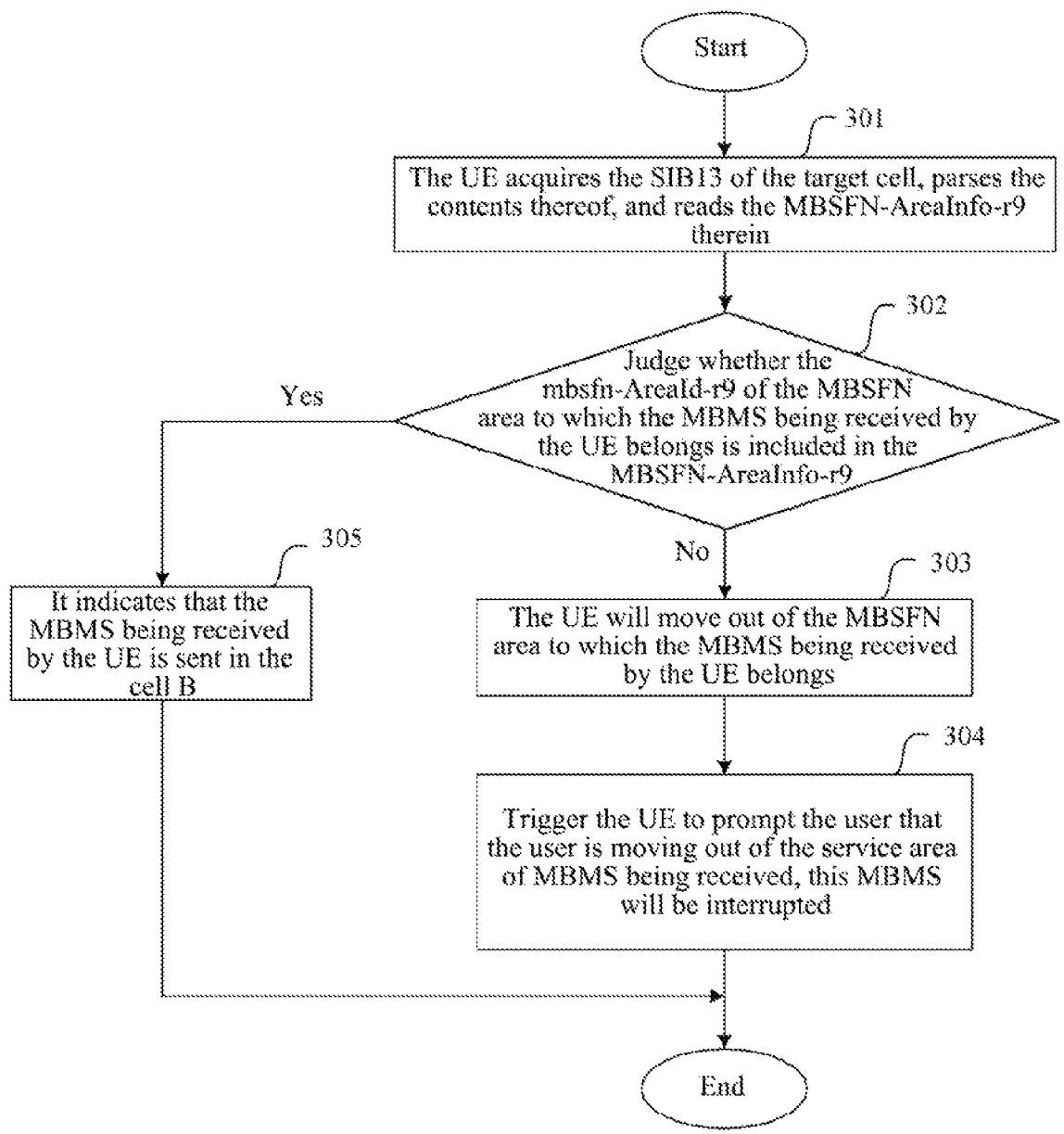
FIG. 3 is a behavior flowchart of a UE in the present invention.

As shown in FIG. 3, the following steps are included.

Step 301, after having received the SIB13 of the target cell (i.e. the UE are moving to this cell), the UE reads the MBSFN-AreaInfo-r9 therein.

Step 302, the UE judges whether the mbsfn-AreaId-r9 of the MBSFN area to which the MBMS being received by the UE belongs is included in the MBSFN-AreaInfo-r9, if yes (it indicates that the source cell and the target cell include the same mbsfn-AreaId-r9 of the MBSFN area), then perform step 305, otherwise, perform step 303.

Step 303, it indicates that the UE will move out of or has already moved out of the MBSFN area to which the MBMS being received belongs and also indicates that the MBSFN area will no longer be consecutive in the target cell.

```
                    SystemInformationBlockType1 message

-- ASN1START
    SystemInformationBlockType1 ::=    SEQUENCE {
                                        cellAccessRelatedInfo SEQUENCE {
                                          plmn-IdentityList   PLMN-IdentityList,
                                          trackingAreaCode   TrackingAreaCode,
                                          cellIdentity   CellIdentity,
                                          cellBarred    ENUMERATED    {barred,
notBarred},
                                          intraFreqReselection   ENUMERATED
{allowed, notAllowed},
                                          csg-Indication   BOOLEAN,
                                          csg-Identity    CSG-Identity-r9 OPTIONAL
-- Need or
                                        },
    ......
    SchedulingInfoList ::= SEQUENCE (SIZE (1..maxSI-Message)) OF SchedulingInfo
    SchedulingInfo ::=           SEQUENCE {
                                 si-Periodicity    ENUMERATED {
                                     rf8, rf16, rf32, rf64, rf128, rf256, rf512},
                                 sib-MappingInfo    SIB-MappingInfo
    }
    SIB-MappingInfo ::= SEQUENCE (SIZE (0..maxSIB−1)) OF SIB-Type
    SIB-Type ::=                ENUMERATED {
                                    sibType3, sibType4, sibType5, sibType6,
                                    sibType7,    sibType8,    sibType9,
sibType10,
                                    sibType11,         sibType12-v9x0,
sibType13-v9x0, spare5,
                                    spare4, spare3, spare2, spare1, ...}
    -- ASN1STOP
```

As to step 303, that the UE will move out of the MBSFN area to which the MBMS being received belongs is judged after the UE receives the SIB13 of the target cell in the source cell; and that the UE has already moved out of the MBSFN area to which the MBMS being received belongs is judged after the UE receives the SIB13 of the target cell in the target cell.

Step 304, the UE can trigger the prompt information to prompt the user that since the user has already left the service area of MBMS being received, this MBMS will be interrupted or that the quality of MBMS received by the UE at this moment is not ensured by the operator since the UE has already left the MBMS subscription area at this moment; end.

Step 305, it indicates that the MBMS being received by the UE is sent in the target cell, and at the same time, it indicates that the MBSFN area is consecutive between the target cell and the source cell, and at this moment, the UE can receive MBMS according to normal flow, end.

In this case, when the UE judges that there is MBMS received by the UE in the target cell but the MBMS of the UE is interrupted in the target cell (it cannot be received correctly, the image quality is poor, there are snow points, etc.), the UE can prompt the user that this place belongs to an area with poor signal coverage quality of the operator.

Figure 4:
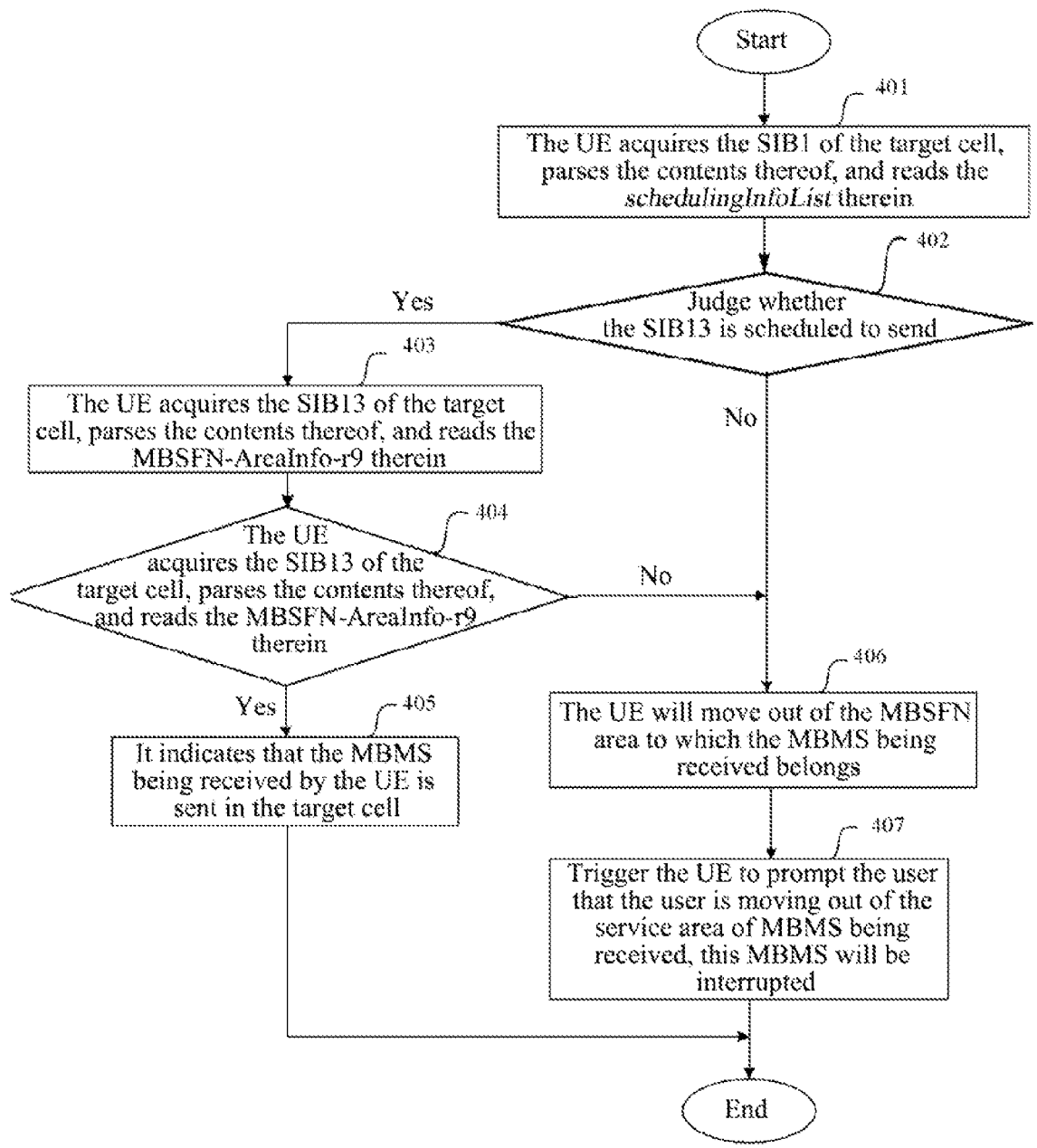
FIG. 4 is a behavior flowchart of the UE in the present invention.

As shown in FIG. 4, the following steps are included.

Step 401, the UE receives the SIB1 of the target cell.

Step 402, the UE judges whether the SIB13 is scheduled to send according to the parameter schedulingInfoList in SIB1, if the SIB13 is not scheduled to send (i.e. SIB13 is not sent in target cell B), then perform step 406, and if the SIB13 is scheduled to send, then perform step 403.

Step 403, the UE receives the SIB13 and reads the MBSFN-AreaInfo-r9 therein.

Step 404, the UE judges whether the identifier of the MBSFN area to which the MBMS being received by the UE belongs is included in the MBSFN-AreaInfo-r9, if yes, then perform step 405, otherwise, perform step 406.

Step 405, it indicates that the MBMS being received by the UE is sent in the target cell. At this moment, the UE can receive the MBMS according to the existing flow. When the UE judges that there is MBMS received by the UE in the target cell but the MBMS of the UE is interrupted in the target cell (it cannot be received correctly, the image quality is poor, there are snow points, etc.), the UE can prompt the user that this place belongs to an area with poor MBMS signal coverage quality of the operator.

Step 406, it indicates that the UE will move out of or has already moved out of the MBSFN area to which the MBMS being received belongs.

As to step 406, that the UE will move out of the MBSFN area to which the MBMS being received belongs is judged after the UE receives the SIB1 of the target cell in the source cell. That the UE has already moved out of the MBSFN area to which the MBMS being received belongs is judged after the UE receives the SIB1 of the target cell in the target cell.

Step 407: the UE can trigger the prompt information to prompt the user that since the user has already left the service area of MBMS being received, this MBMS will be interrupted or that the quality of MBMS received by the UE at this moment is not ensured by the operator since the UE has already left the MBMS subscription area at this moment; end.

Embodiment 2

Embodiment 2 corresponds to the situation of moving between the cells within the MBSFN area.

Assuming there is a certain MBSFN area, as shown in FIG. 1 or 2, when the UE moves from cell A to cell C in the MBSFN area, cell C is referred to as target cell. The UE does not know whether the target cell has already moved out of the MBSFN area or whether the target cell has the MBMS being received by the UE, or whether the MBSFN area is consecutive in the target cell.

Method 1, after having received the SIB13 of cell C (target cell, i.e. the UE will move to this cell), the UE shall read the MBSFN-AreaInfo-r9 therein, then judges whether the mbsfn-AreaId-r9 of the MBSFN area to which the MBMS being received by the UE belongs is included in the MBSFN-AreaInfo-r9. In this embodiment, since cell C belongs to the MBSFN area, then the mbsfn-AreaId-r9 of the MBSFN area to which the MBMS being received by the UE belongs is included in the MBSFN-AreaInfo-r9, then MBMS being received by the UE is sent in cell C (i.e. the MBSFN area is consecutive in the target cell), and at this moment, the UE can receive the MBMS according to the existing flow. When the user judges that there is MBMS being received thereby in cell C, but the MBMS of the UE is interrupted in cell C (it cannot be received correctly, the image quality is poor, there are snow points, etc.), then the UE can prompt the user that this place belongs to an area with poor MBMS signal coverage quality of the operator.

Method 2, when the UE receives SIB1 of cell C, the UE can judge whether SIB13 is scheduled to send according to the parameter schedulingInfoList in SIB1. In this embodiment, since cell C is an area in the MBSFN area, its SIB13 is scheduled to send, and then the UE receives the SIB13 and reads the MBSFN-AreaInfo-r9 therein. Then, the UE judges whether the identifier of the MBSFN area to which the MBMS being received thereby belongs is included in the MBSFN-AreaInfo-r9. In this embodiment, since cell C is an area in the MBSFN area, then the identifier of the MBSFN area to which the MBMS being received by the UE belongs is included in the MBSFN-AreaInfo-r9, it indicates that the MBMS being received by the UE is sent in cell C. At this moment, the UE can receive the MBMS according to the existing flow. When the UE judges that there is MBMS received thereby in cell C but the MBMS of the UE is interrupted in the cell C (it cannot be received correctly, the image quality is poor, there are snow points, etc.), the UE can prompt the user that this place belongs to an area with poor MBMS signal coverage quality of the operator.

The present invention also provides a user equipment (UE), wherein, the UE is used for, when the UE moves from a source cell to a target cell, judging whether it will move out of or it has already moved out of one or more multimedia broadcast multicast single frequency network (MBSFN) areas (or judging whether one or more MBSFN areas are consecutive between the source cell and the target cell).

The UE has MBMS ability.

The UE is configured to: when moving from the source cell to the target cell, when the UE is receiving an MBMS or is receiving an MCCH update notification message, judge whether it will move out of an MBSFN area to which the MBMS being received by the UE belongs or to which the MCCH update notification message being monitored by the UE belongs.

The UE is further configured to: when judging that it will move out of or it has already moved out of the MBSFN areas, display prompt information to the user for prompting the user that the UE will move out of or has already moved out of the MBSFN area or an MBMS subscription area and the MBMS will be interrupted or the quality of the MBMS is not ensured.

The UE is configured to judge whether the UE will move out of or has already moved out of one or more MBSFN areas by way of the following manners:

judge whether a system information block type 13 of the target cell is scheduled to send, when the system information block type 13 is not scheduled to send, the UE judges that the UE will move out of or has already moved out of the MBSFN area; when the system information block type 13 of the target cell is scheduled to send, further acquire one or more parameters in the MBSFN area information carried in the system information block type 13, and judge whether the UE will move out of or has already moved out of the MBSFN area according to the one or more parameters;

or, directly acquire one or more parameters in the MBSFN area information carried in the system information block type 13 of the target cell and judge whether the UE will move out of or has already moved out of the MBSFN area according to the one or more parameters.

the UE judges whether a system information block type 13 of the target cell is scheduled to send, when the system information block type 13 is not schedule acquire an MBSFN area information list and/or MCCH configuration information list carried in the system information block type 13 of the target cell, judge whether a MBSFN area identifier of the MBSFN area to which the UE belongs is included in the MBSFN area information list carried in the system information block type 13 of the target cell, if not included, then judge that the UE will move out of or has already moved out of the MBSFN area; and/or, judge whether the MCCH configuration information about the MBSFN area to which the UE belongs is included in the MCCH configuration information list carried in the system information block type 13, if not included, then judge that the UE it will move out of or has already moved out of the MBSFN area.

The UE is configured to: acquire an MBSFN area information list and/or MCCH configuration information list carried in the system information block 13 of the target cell, judge whether the MBSFN area identifier of the MBSFN area to which the UE belongs is included in the MBSFN area information list carried system information block 13 of the target cell, if not included, then judge whether it will move out of or has already moved out of the MBSFN area; and/or, judge whether the MCCH configuration information about the MBSFN area to which the UE belongs is included in the MCCH configuration information list carried in the system information block 13, if not included, then judge whether it will move out of or has already moved out of the MBSFN area.

What is described above is merely preferred embodiments of the present invention and not intended to limit the present invention, and the present invention can further have other various embodiments; those skilled in the art can make various corresponding changes and variations according to the present invention without departing from the spirit and essence of the present invention, and all these corresponding changes and variations shall belong to the scope of protection of the appended claims of the present invention.

Those skilled in the art shall understand that all of or part of the steps in the above methods can be completed by instructing relevant hardware by programs, and the programs can be stored in a computer readable storage medium, such as read only memory, magnetic disk, or optical disk, etc. Optionally, all of or part of the steps of the above embodiments can also be implemented using one or more integrated circuits.

Accordingly, the respective module/unit in the above embodiments can be implemented by use of hardware or software function module. The present invention is not limited to any particular form of combination of hardware and software.

INDUSTRIAL APPLICABILITY

In the present invention, when the MBMS being received by the UE is interrupted (or to be interrupted), the UE can correctly judge whether it is caused by poor signal coverage quality in the subscription area of the operator or the MBMS interruption is caused by the user himself, thus the responsibility can be clarified and the user can be prompted timely, reducing the responsibility dispute between the operator and the user and improving user experience. Furthermore, by the present invention, accurate judgment can be achieved by using some existing information from the view of the user with no need of the cooperation of the network side, or the network side to send a signaling.

I claim:

1. A method for mobile reception of a multimedia broadcast multicast service (MBMS) by a user equipment (UE), comprising:
   when the UE moves from a source cell to a target cell, the UE determining whether the UE will move out of or has already moved out of one or more multimedia broadcast multicast single frequency network (MBSFN) areas;
   wherein the UE determines whether the UE will move out of or has already moved out of the one or more MBSFN areas by the following steps of:
   determining whether a SystemInformationBlockType13 of the target cell is scheduled to send, when the SystemInformationBlockType13 is not scheduled to send, determining that the UE will move out of or has already moved out of the MBSFN area; when the SystemInformationBlockType13 of the target cell is scheduled to send, further acquiring one or more parameters in the MBSFN area information carried in the SystemInformationBlockType13, and determining whether the UE will move out of or has already moved out of the MBSFN area according to the one or more parameters; or
   directly acquiring one or more parameters in the MBSFN area information carried in the SystemInformationBlockType13 of the target cell and determining whether the UE will move out of or has already moved out of the MBSFN area according to the one or more parameters.

2. The method as claimed in claim 1, wherein the UE is a UE with MBMS ability, and the UE comprises a UE which is receiving an MBMS or a UE which is monitoring a multicast control channel (MCCH) change notification message.

3. The method as claimed in claim 1, wherein moving out of one or more MBSFN areas comprises: moving out of an MBSFN area to which the MBMS being received by the UE belongs, or moving out of an MBSFN area to which an MCCH change notification message being monitored by the UE belongs.

4. The method as claimed in claim 1, wherein when the UE moves from the source cell to the target cell, when the UE is located in the source cell, the UE determines whether the UE will move out of the one or more MBSFN areas; and when the UE is located in the target cell, the UE determines whether the UE has already moved out of the one or more MBSFN areas.

5. The method as claimed in claim 1, the method further comprising: when the UE determines that the UE will move out of or the UE has already moved out of the one or more MBSFN areas, the UE displaying prompt information to a user for prompting the user that the UE will move out of or has already moved out of the MBSFN area or an MBMS subscription area and the MBMS will be interrupted or the quality of the MBMS is not ensured.

6. The method as claimed in claim 1, wherein the one or more parameters comprise an MBSFN area information list or an MCCH configuration information list, and the step of determining whether the UE will move out of or has already moved out of the MBSFN area according to the one or more parameters comprises:
the UE determining whether an MBSFN area identifier of the MBSFN area is included in the MBSFN area information list carried in the SystemInformationBlockType13 of the target cell, if not included, then the UE determining that the UE will move out of or has already moved out of the MBSFN area, and the MBSFN area is inconsecutive between the source cell and the target cell, if included, then the MBSFN area is consecutive between the target cell and the source cell; or
the UE determining whether the MCCH configuration information about the MBSFN area to which the UE belongs is included in the MCCH configuration information list carried in the SystemInformationBlockType13 of the target sell, if not included, then the UE determining that the UE will move out of or has already moved out of the MBSFN area.

7. A user equipment comprising: at least one processor (UE), configured to:
when moving from a source cell to a target cell, determine whether the UE will move out of or has already moved out of one or more multimedia broadcast multicast single frequency network (MBSFN) areas;
wherein the UE is configured to determine whether the UE will move out of or has already moved out of the one or more MBSFN areas by:
determining whether a SystemInformationBlockType13 of the target cell is scheduled to send, when the SystemInformationBlockType13 is not scheduled to send, determining that the UE will move out of or has already moved out of the MBSFN area; when the SystemInformationBlockType13 of the target cell is scheduled to send, further acquiring one or more parameters in the MBSFN area information carried in the SystemInformationBlockType13, and determining whether the UE will move out of or has already moved out of the MBSFN area according to the one or more parameters; or
directly acquiring one or more parameters in the MBSFN area information carried in the SystemInformationBlockType13 of the target cell and determining whether the UE will move out of or has already moved out of the MBSFN area according to the one or more parameters.

8. The UE as claimed in claim 7, wherein the UE is a UE with multimedia broadcast multicast service ability.

9. The UE as claimed in claim 7, wherein the UE is configured to:
when moving from the source cell to the target cell, when the UE is receiving an MBMS or is receiving an MCCH change notification message, determine whether the UE will move out of an MBSFN area to which the MBMS being received by the UE belongs or to which the MCCH change notification message being monitored by the UE belongs.

10. The UE as claimed in claim 7, wherein the UE is further configured to: when determining that the UE will move out of or has already moved out of the MBSFN area, display prompt information to a user for prompting the user that the UE will move out of or has already moved out of the MBSFN area or an MBMS subscription area and the MBMS will be interrupted or the quality of the MBMS is not ensured.

11. The UE as claimed in claim 7, wherein the one or more parameters comprise an MBSFN area information list or an MCCH configuration information list, and the UE is configured to:
determine whether an MBSFN area identifier of the MBSFN area to which the UE belongs is included in the MBSFN area information list carried in the SystemInformationBlockType13 of the target cell, if not included, then determine that the UE will move out of or has already moved out of the MBSFN area; or
determine whether the MCCH configuration information about the MBSFN area to which the UE belongs is included in the MCCH configuration information list carried in the SystemInformationBlockType13 of the target cell, if not included, then determine that the UE will move out of or has already moved out of the MBSFN area.

12. A method for mobile reception of a multimedia broadcast multicast service (MBMS) by a user equipment (UE), comprising:
when a UE moves from a source cell to a target cell, the UE determining whether one or more multimedia broadcast multicast single frequency network (MBSFN) areas to which the UE belongs are consecutive between the source cell and the target cell;
wherein the UE determines whether the one or more MBSFN areas to which the UE belongs are consecutive between the source cell and the target cell by the following steps of:
the UE determining whether an MBSFN area identifier of the MBSFN area is included in an MBSFN area information list carried in a SystemInformationBlockType13 of the target cell, if not included, then the UE determining that the MBSFN area is inconsecutive between the source cell and the target cell, if included, then the UE determining that the MBSFN area is consecutive between the target cell and the source cell.

13. The method as claimed in claim 12, wherein the UE is a UE with MBMS ability, and the UE comprises a UE which is receiving an MBMS or a UE which is monitoring a multicast control channel (MCCH) change notification message.

14. The method as claimed in claim 12, wherein the one or more MBSFN areas comprises: an MBSFN area to which the MBMS being received by the UE belongs, or an MBSFN area to which an MCCH change notification message being monitored by the UE belongs.

15. The method as claimed in claim 12, the method further comprising: when the UE determines that the one or more MBSFN areas are inconsecutive between the source cell and the target cell, the UE displaying prompt information to a user for prompting the user that the UE will move out of or has already moved out of the MBSFN area or an MBMS subscription area and the MBMS will be interrupted or the quality of the MBMS is not ensured.

16. A user equipment comprising: at least one processor (UE), configured to:
when moving from a source cell to a target cell, determine whether one or more multimedia broadcast multicast single frequency network (MBSFN) areas to which the UE belongs are consecutive between the source cell and the target cell;
wherein the UE is configured to determine whether the one or more MBSFN areas to which the UE belongs are consecutive between the source cell and the target cell by:

determining whether an MBSFN area identifier of the MBSFN area is included in an MBSFN area information list carried in a SystemInformationBlockType13 of the target cell, if not included, then determining that the MBSFN area is inconsecutive between the source cell and the target cell, if included, then determining that the MBSFN area is consecutive between the target cell and the source cell.

17. The UE as claimed in claim 16, wherein, the UE is a UE with MBMS ability, and the UE comprises a UE which is receiving an MBMS or a UE which is monitoring a multicast control channel (MCCH) change notification message.

18. The UE as claimed in claim 16, wherein the one or more MBSFN areas comprise: an MBSFN area to which an MBMS being received by the UE belongs, or an MBSFN area to which an MCCH change notification message being monitored by the UE belongs.

19. The UE as claimed in claim 16, the UE is further configured to: when determining that the one or more MBSFN areas are inconsecutive between the source cell and the target cell, display prompt information to a user for prompting the user that the UE will move out of or has already moved out of the MBSFN area or an MBMS subscription area and the MBMS will be interrupted or the quality of the MBMS is not ensured.

* * * * *